(12) United States Patent　　　(10) Patent No.:　US 12,558,640 B2

Seales et al.　　　　　　　　　　　(45) Date of Patent:　Feb. 24, 2026

(54) AIR FILTER MOUNTING PLATE

(71) Applicant: Camfil Aktiebolag, Stockholm (SE)

(72) Inventors: Frank Seales, Lachine (CA); Jack Thomas Clements, Lees Summit, MN (US); Pascal Lee, Montreal (CA); Rose Avedissian, Laval (CA); Lars Westlund, Trosa (SE); Mikael Forslund, Bromma (SE)

(73) Assignee: CAMFIL AKTIEBOLAG, Stockholm (SE)

( * ) Notice: Subject to any disclaimer, the term of this patent is extended or adjusted under 35 U.S.C. 154(b) by 353 days.

(21) Appl. No.: 18/218,616

(22) Filed: Jul. 6, 2023

(65) Prior Publication Data

US 2024/0009608 A1　　Jan. 11, 2024

(30) Foreign Application Priority Data

Jul. 11, 2022　　(SE) .................................... 2250892-3

(51) Int. Cl.
　　*B01D 46/24*　　　(2006.01)
　　*B01D 46/00*　　　(2022.01)

(52) U.S. Cl.
　　CPC ..... *B01D 46/2414* (2013.01); *B01D 46/0005* (2013.01); *B01D 2265/022* (2013.01); *B01D 2265/06* (2013.01); *B01D 2267/30* (2013.01); *B01D 2267/70* (2013.01); *B01D 2271/022* (2013.01); *B01D 2271/025* (2013.01)

(58) Field of Classification Search
　　CPC ................ B01D 46/0005; B01D 46/02; B01D 46/2411; B01D 46/2414; B01D 2265/022; B01D 2265/06; B01D 2267/30; B01D 2267/70; B01D 2271/022; B01D 2271/025; B01D 2201/291; B01D 2201/296; B01D 2201/342
　　See application file for complete search history.

(56) References Cited

U.S. PATENT DOCUMENTS

| | | | |
|---|---|---|---|
| 10,639,575 B2 * | 5/2020 | Morgan | ............ B01D 46/0005 |
| 2005/0229563 A1 * | 10/2005 | Holzmann | ......... B01D 46/2414 |
| | | | 55/502 |
| 2006/0037296 A1 | 2/2006 | Duffy | |

(Continued)

FOREIGN PATENT DOCUMENTS

| | | |
|---|---|---|
| DE | 102009008450 A1 | 8/2010 |
| GB | 1253354 | 11/1971 |

(Continued)

OTHER PUBLICATIONS

Extended European Search Report dated Dec. 8, 2023; European Patent Application No. 23182950.8; 7 pages.

*Primary Examiner* — Robert Clemente

(74) *Attorney, Agent, or Firm* — McDonald Hopkins LLC

(57)　　　　ABSTRACT

An air filter mounting plate having sealing side and a filter media retaining side, said mounting plate including an air passage opening and a gasket encircling the air passage opening provided on sealing side of the mounting plate, the gasket comprising a connection portion and double sealing lips (7a,7b) extending from the connection portion, and wherein the gasket is joined with the mounting plate by the connection portion being fixed on the sealing side of the mounting plate.

17 Claims, 3 Drawing Sheets

(56)                    References Cited

U.S. PATENT DOCUMENTS

2008/0086995  A1 *   4/2008   Westlund  ...........  B01D 46/2414
                                                           55/502
2011/0308212  A1 *  12/2011   Ruhland  ...............  B01D 46/64
                                                           55/498
2016/0023150  A1 *   1/2016   Morgan  ................  B01D 46/88
                                                           29/451

FOREIGN PATENT DOCUMENTS

WO         2009146962  A1    12/2009
WO         2021112753         6/2021
WO         2022131989         6/2022
WO      WO-2023044440  A1 *   3/2023   ...........  B01D 46/525

* cited by examiner

4

5

10

7b

8

7a

1

5

2

120

4

1

121

17

5

AIR FILTER MOUNTING PLATE

CROSS-REFERENCE TO RELATED APPLICATIONS

This application claims priority to Sweden Application No. 2250892-3 filed on Jul. 11, 2022 which is hereby incorporated by reference in its entirety.

TECHNICAL FIELD

The present disclosure relates to an air filter mounting plate having sealing side and a filter media retaining side. More specifically, the disclosure relates to an air filter mounting plate having sealing side and a filter media retaining side as defined in the introductory parts of the independent claims.

BACKGROUND ART

Hollow air filters typically include some kind of support arrangement to hold a hollow air filter media pack in position against a housing, mounting frame, ceiling grid, base plate or tube sheet in an air filter arrangement. It is important that the air filter is properly sealed to e.g. the base plate or tube sheet to avoid leakage. However, there is a continuous desire to improve performance and reduce cost within air filtration, and there is thus a need for improved air filters that show improved sealing properties and are easy to manufacture.

SUMMARY

According to a first aspect of the present disclosure there is provided an air filter mounting plate having a sealing side and a filter media retaining side, the mounting plate including an air passage opening and a gasket encircling the air passage opening provided on sealing side of the mounting plate. The gasket comprises a connection portion and double sealing lips extending from the connection portion, and the gasket is joined with the mounting plate by the connection portion being fixed on the sealing side of the mounting plate. The double sealing lips in combination with the connection portion of the gasket being fixed to the mounting plate provides improved sealing when a filter cartridge including the mounting plate is mounted in an air filter arrangement.

The connection portion may be fixed in a recess, and the gasket may be attached to the mounting plate by co-injection molding. The connection portion of the gasket may comprise an outermost attachment portion and a waist portion located between the attachment portion and the double sealing lips. A recess on the sealing side may be configured to receive the outermost attachment portion of the gasket, and can have an opening, which is narrower than the attachment portion of the gasket.

The double sealing lips suitably extend in divergent directions from the connection portion and may preferably have a curved cross-sectional shape. At least one rib may advantageously be provided on at least one of the double sealing lips and may preferably be located in the vicinity of an outward edge of the lip.

The air filter mounting plate may include one or more attachment members protruding from the sealing side of the mounting plate. Such attachment members may be configured to attach the mounting plate to a base plate of an air filter arrangement and wherein the gasket is advantageously located outside of the attachment members in relation to the opening.

At least one of the double sealing lips of the gasket may suitably taper towards an outward edge of the lip to form a sharp lip edge. The sealing lips may have the same height in relation to the connection portion and may extend to a common plane corresponding to an abutment surface of a base plate in a mounting structure, or alternatively, the sealing lips may include a first sealing lip, which is preferably located outward of a second sealing lip in relation to the opening, and which has a greater height than the second sealing lip in relation to the connection portion. The sealing lips may suitably diverge by an angle of 20-60 degrees with respect to a center line extending through the connection portion. A pressure relieving opening (e.g. a pinhole) may be provided in one of the sealing lips, preferably in the second sealing lip that is located inward of the first sealing lip in relation to the opening.

At least one stop member may advantageously be located on the sealing side of the mounting plate, said stop members having an abutment surface extending further from the mounting plate than the connection portion.

The gasket is preferably made of non-porous rubber or rubber having a permeability value less than 3 kg per s per $m^2$. Suitably, the gasket is made of rubber of 10-100 Shore A hardness, preferably 25-75 Shore A, more preferably 40-70 Shore A.

The present disclosure will become apparent from the detailed description and example embodiments given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described since such device may vary. It is also to be understood that the terminology used herein is for the purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting description of example embodiments of the present disclosure, when taken in conjunction with the accompanying drawings.

DETAILED DESCRIPTION

Figure 1:
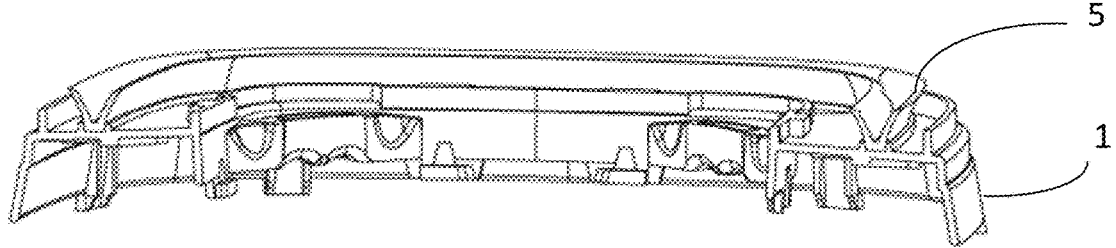
FIG. 1 shows a cross-sectional view of the mounting plate of the present disclosure.

The air filter mounting plate of the present disclosure has a sealing side and a filter media retaining side, the mounting plate including an air passage opening and a gasket encircling the air passage opening provided on the sealing side of the mounting plate. The gasket comprises a connection portion and double sealing lips extending from the connection portion, and the gasket is joined with the mounting plate by the connection portion being fixed on the sealing side of the mounting plate. The double sealing lips in combination with the connection portion of the gasket being fixed to the mounting plate provides improved sealing when a filter cartridge including the mounting plate is mounted in an air filter arrangement, since two parallel leakage preventing seals are provided.

In the context of the present disclosure, the term base plate is intended to refer to any of the following: housing, mounting frame, ceiling grid, base plate or tube sheet in an air filter arrangement.

The mounting plate is intended for use in an air filter support structure comprising a hollow air filter media pack or a hollow construction where at least one side is a filter media pack. The air filter media pack and the mounting plate forms an air filter cartridge. The cartridge may further include a filter media supporting cage. The sealing surface of the mounting plate is intended to be directed toward a base plate of an air filter arrangement and to be placed in abutment with the base plate to cover an air passage opening. In some embodiments, the mounting plate may be placed in abutment with a front end plate of another air filter cartridge, in which case said front end plate of the other air filter cartridge is an open end plate allowing air flow passage through both air filter cartridges.

The air filter cartridge and the air filter media pack may for example have circular, oval or rectangular or square cross-sectional shape. The air filter cartridge may also have some sides with filter packs and some sides blocked with side plates like in a 4-vee, or V-bank, filter frame construction.

The gasket is a one-piece element arranged around the air passage opening and seals between the mounting plate and the abutment surface in the air filter arrangement to prevent leakage.

Various ways of obtaining the gasket and joining it to the mounting plate can be contemplated, such as co-injection molding with the mounting plate, pouring gasket material onto the sealing side of the mounting plate, or manufacturing the gasket separately and fixing the gasket to the frame by an adhesive or mechanically attaching it to the mounting plate. The most preferred method is co-injection molding of the gasket, since this results in excellent seal compared to gasket fixed according to other methods, and it also is more effective to manufacture as the gasket can be produced simultaneously with the mounting plate. The connection portion may be fixed in a recess to facilitate manufacture. The recess may for example be formed as a groove in the material on the sealing side of the mounting plate or may be formed between two substantially parallel protrusion running along the surface of the mounting plate. Alternatively, the gaskets may be made from a linear strip and attached together with an adhesive at the seam, be a continuous gasket without any seam.

The connection portion of the gasket may comprise an outermost attachment portion and a waist portion located between the attachment portion and the double sealing lips. A recess on the sealing side may be configured to receive the outermost attachment portion of the gasket and can have an opening which is narrower than the attachment portion of the gasket. This configuration allows a separately manufactured gasket to be retained in the mounting plate but can also be used for co-injection molded and poured gaskets.

The double sealing lips suitably extend in divergent directions from the connection portion, such that they form a small closed volume together with a mating sealing surface against which they are pressed when mounted in an air filter. Preferably, the double sealing lips diverge from a common linking point at the center of the connection portion to form a "V"-like configuration, giving a very small closed volume between the sealing lips and the mating sealing surface when mounted. The sealing lips may preferably have a curved cross-sectional shape. The sealing lips may suitably diverge by an angle of 20-60 degrees with respect to a center line extending through the connection portion and through the common linking portion of the sealing lips. When the air filter mounting plate with the gasket is mounted on a base plate, the double sealing lips of the gasket will be bent and will extend further in divergent directions without the material as such being compressed. This is an advantage compared to gaskets sealed by compression of the gasket material, which may suffer a memory effect that may lead to leakage at a later removal or reinstallation. The diverging sealing lips can replace bulk material used in conventional gaskets, and thus the height of the gasket in relation to the sealing surface can be increased. Installation is facilitated since lower force is needed for diverging of the sealing lips, reducing the force experienced by the filter during installation. Further, the diverging lips can create a suction force when installed and require some effort to remove from a base plate or tube sheet or front plate of another filter cartridge, ensuring a strong seal.

In some cases where a suction force is undesired, one or more small openings, e.g. pinholes, can be provided in one of the sealing lips. Thereby, when the gasket is pressed toward a mating sealing surface, the double sealing effect is obtained, but without any suction force, which may be especially advantageous in installations where the interior of filter cartridge is difficult to access and must for example be slided sideways before it can be removed from the air filter installation. This may for example be beneficial in pulse filter installations where a plurality of air filter cartridges are arranged in one or more rows to seal against a tube sheet. The opening, or pinhole, has a very small diameter, preferably 0.1-10 mm, and allows a very small amount of air to pass through the sealing lip. Preferably, an opening may be provided in the second sealing lip, i.e. the one that is located inward in relation to the air passage opening of the mounting plate, and thus toward the air passage opening of the tube sheet. This gives a secure tight seal toward the outside of the pulse filter cartridge, and a sufficient seal toward the inside of the cartridge. In a pulse filter cartridge, the filtration air flow direction is from the outside of the cartridge to the inside thereof, while the pulse direction is from the inside to the outside of the cartridge. Thus, it is more important that the seal is entirely tight toward the outside of the filter cartridge. The small size of the opening or pinhole ensures that the pulse does not affect the seal provided by the inward sealing lip. A plurality of openings can be provided in the sealing lip, preferably evenly distributed over the circumference of the gasket. Suitably, 2-4 openings can be provided in the sealing lip.

A curved cross-sectional shape in the sealing lips ensures smooth splaying when the gasket is compressed during installation. The gasket may have substantially the same cross-sectional shape along its entire length.

The gasket with double sealing lips is particularly advantageous for use in pulse filters as it provides a seal in both forward and reverse direction when the air filter is used in a pulse filter application. The outward sealing lip of the gasket in a direction from the air passage opening (i.e. having larger diameter) seals against dirt and contaminants during filtration, and the inward sealing lip (i.e. having smaller diameter) maintains the seal when a reverse pulse of air is used. This prevents the outward gasket lip from being lifted up by each pulse, which would dissipate some of the pulse energy and risk that dirt may settle underneath it and cause the seal to be lost. When the air filter cartridge is used as a pulse filter, the air flow direction for the filtering operation is typically directed through the air filter media pack and out through the air passage opening, while the pulse flow typically has the opposite direction.

The sealing lips may have the same height in relation to the connection portion and may extend to a common plane corresponding to an abutment surface of a base plate in a mounting structure or a front end plate of an adjacent air filter cartridge, to form a sealed interior volume (gasket space) between the gasket and the abutment surface. Alternatively, the sealing lips may include a first sealing lip, which is preferably located outward of a second sealing lip in relation to the opening, and which has a greater height than the second sealing lip in relation to the connection portion.

At least one, preferably both, of the double sealing lips of the gasket may suitably taper towards an outward edge of the lip to form a sharp lip edge to improve sealing. A rib may advantageously be provided on at least one, preferably both, of the double sealing lips, and may preferably be located in the vicinity of an outward edge of the lip. The rib reduces the risk of the gasket sealing lip folding in on itself when compressed, and thus ensures that the gasket maintains its shape as it is pushed against the sealing surface, which gives an improved sealing when the gasket is compressed. The rib also ensures there is a point seal where maximum force is applied along the gasket surface, which is important to ensure water tightness. If desired, multiple parallel ribs can be provided to seal at different compression heights in order to further improve the sealing.

At least one stop member may advantageously by located on the sealing side of the mounting plate, said stop members having an abutment surface extending further from the mounting plate than the connection portion, to prevent accidental application of too high pressure on the gasket, and thereby prevent loss of sealing or even avoid possible compression set, that may destroy the gasket.

The air filter mounting plate may include one or more attachment members protruding from the sealing side of the mounting plate. Such attachment members may be configured to attach the mounting plate to a base plate of an air filter arrangement and wherein the gasket is advantageously located outside of the attachment members in relation to the opening. Such attachment members may for example be bayonet couplings where locking of the abutment is obtained by a twisting motion in the length direction of the gasket. Another way of mounting an air filter cartridge including the mounting plate may be to place the cartridge over a mounting stand, e.g. a tripod, which is fixed to the base plate or tube sheet and then attach the cartridge to a front end of the mounting stand.

The gasket is preferably made of non-porous rubber or rubber having a permeability value less than 3 kg per s per $m^2$, to ensure sufficient leak tightness in the gasket. Suitably, the gasket may be made of rubber of 10-100 Shore A hardness, preferably 25-75 Shore A, more preferably 40-70 Shore A, to allow a desired degree of deformation during use while being able to maintain it shape.

If desired the gasket of the present disclosure may be connected to a leak detection system, such as the one described in WO2021/112753A1 or WO2022/131989A1.

Example Embodiments

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 2:
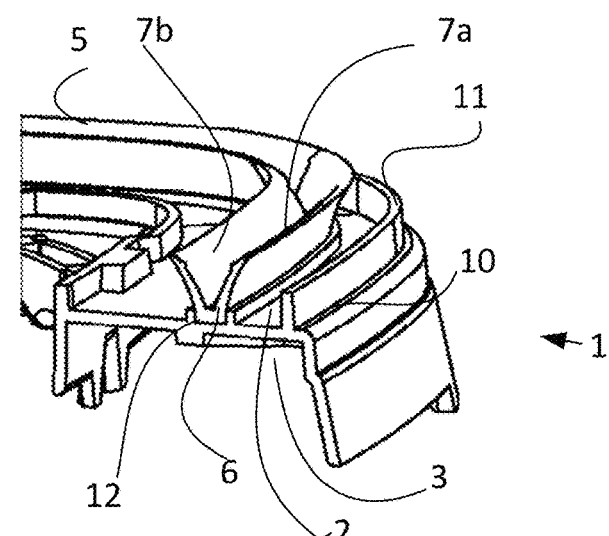
FIG. 2 shows an enlarged portion of the view in FIG. 1.
Figure 4:
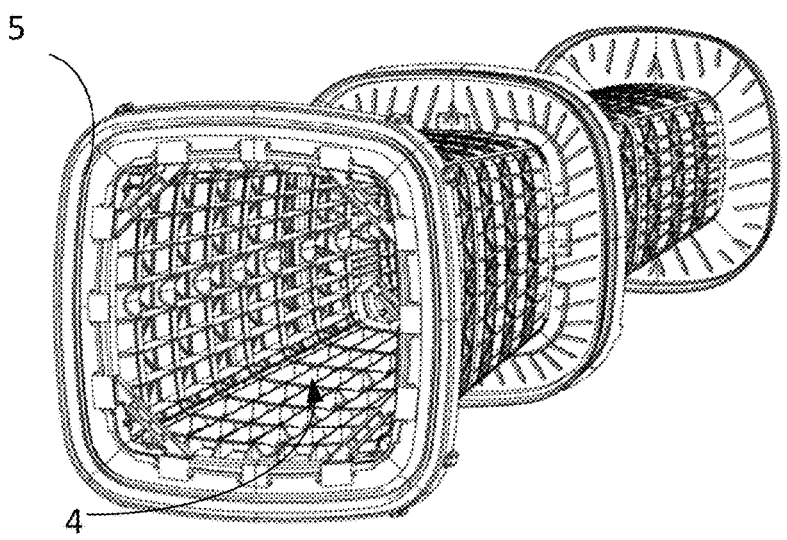
FIG. 4 shows a perspective view of a support structure for use in an air filter cartridge.

As illustrated in FIGS. 1 and 2, the first air filter mounting plate 1 has a sealing side 2 and a filter media retaining side 3. The mounting plate includes an air passage opening 4 (best shown in FIG. 4) and a gasket 5 encircling the air passage opening 4 is provided on sealing side 2 of the mounting plate 1. The gasket comprises a connection portion 6 and double sealing lips 7a, 7b extending from the connection portion, and the gasket is joined with the mounting plate by the connection portion 6 being fixed on the sealing side 2 of the mounting plate.

In the examples shown in FIGS. 1-10, the connection portion 6 is fixed in a recess 12. In the example of FIGS. 1-2 and 5-6, the recess is formed between two protrusions 12'. The connection portion 6 may also advantageously be provided by co-injection.

Figure 3:
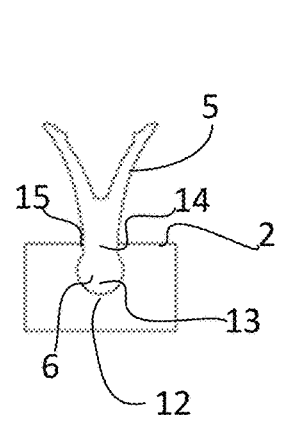
FIG. 3 shows a schematic cross-sectional view of one example of a gasket of the present disclosure.

FIG. 3 illustrates an example, where the connection portion 6 of the gasket 5 comprises an outermost attachment portion 13 and a waist portion 14 located between the attachment portion 13 and the double sealing lips 7a, 7b. A recess 12 on the sealing side 2 of the mounting plate is configured to receive the outermost attachment portion 13 of the gasket, and the opening 15 is narrower than the attachment portion 13 of the gasket, to retain the connection portion in the recess, if it was manufactured separately.

Figure 5:
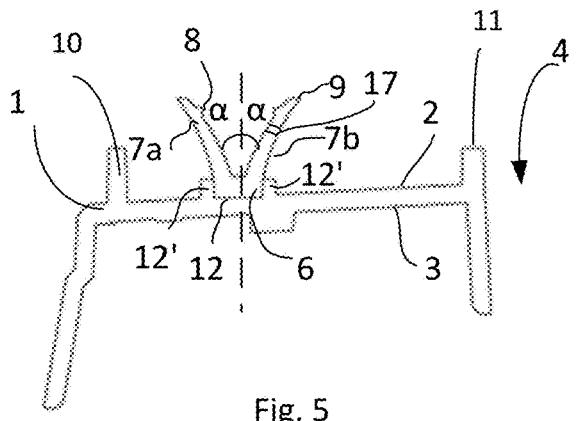
FIG. 5 shows cross-sectional view of the mounting plate with a gasket in un-compressed state.
Figure 6:
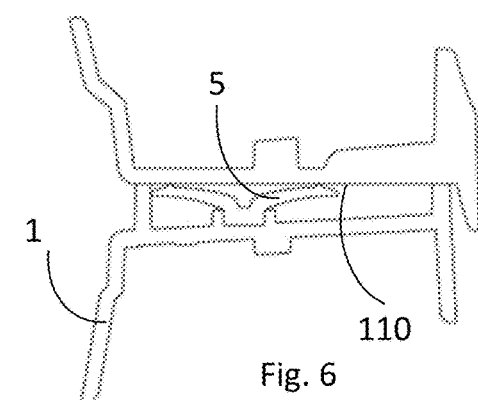
FIG. 6 shows cross-sectional view of a mounting plate with a gasket, when the gasket is compressed against a front end plate of an adjacent air filter cartridge.

The double sealing lips 7a, 7b of the gasket shown in the examples extend in divergent directions from the connection portion 6, and gaskets of FIGS. 1-3 and 5-6 have double sealing lips 7a, 7b with a curved cross-sectional shape, and a rib 8 is provided on each of the sealing lips 7a, 7b, in the vicinity of an outward edge 9 of the lip 7. The sealing lips 7a, 7b also taper towards an outward edge 9 of the lip 7a, 7b to form a sharp lip edge. FIG. 5 illustrates how an opening 17 (pinhole) is provided in one of the sealing lips. FIG. 6 illustrates how the sealing lips have been bent to become more divergent upon installation in an air filter arrangement, where the sealing lips are pressed toward a sealing surface 110 in the air filter arrangement. In the shown example, the sealing surface 110 is a part of a filter retaining mounting plate of an adjacent filter element. In Fig.

Figures 7, 8, 9:
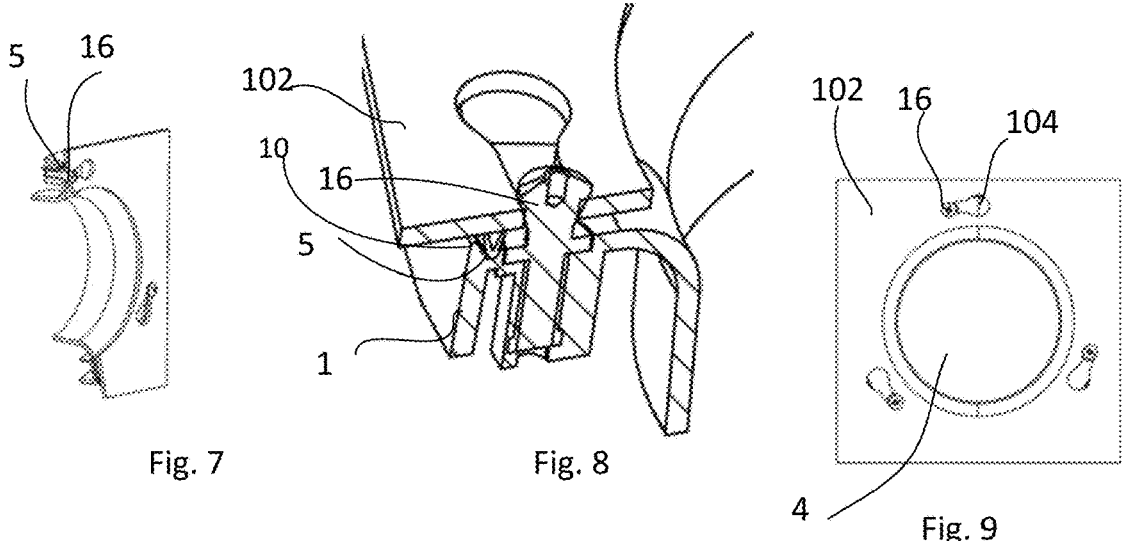
FIG. 7 shows a cross-sectional perspective view of a mounting plate including attachment member and a gasket.
FIG. 8 shows an enlarged portion of FIG. 7.
FIG. 9 shows a base plate of an air filter arrangement seen from a rear end.

FIGS. 7-9 illustrate how attachment members 16 are arranged protruding from the sealing side 2 of the mounting plate. The attachment members are configured to attach the mounting plate to a base plate 102 of an air filter arrangement 101 by means of insertion into a mounting opening in the base plate and the gasket is located outside of the attachment members in relation to the opening 4.

Figure 10:
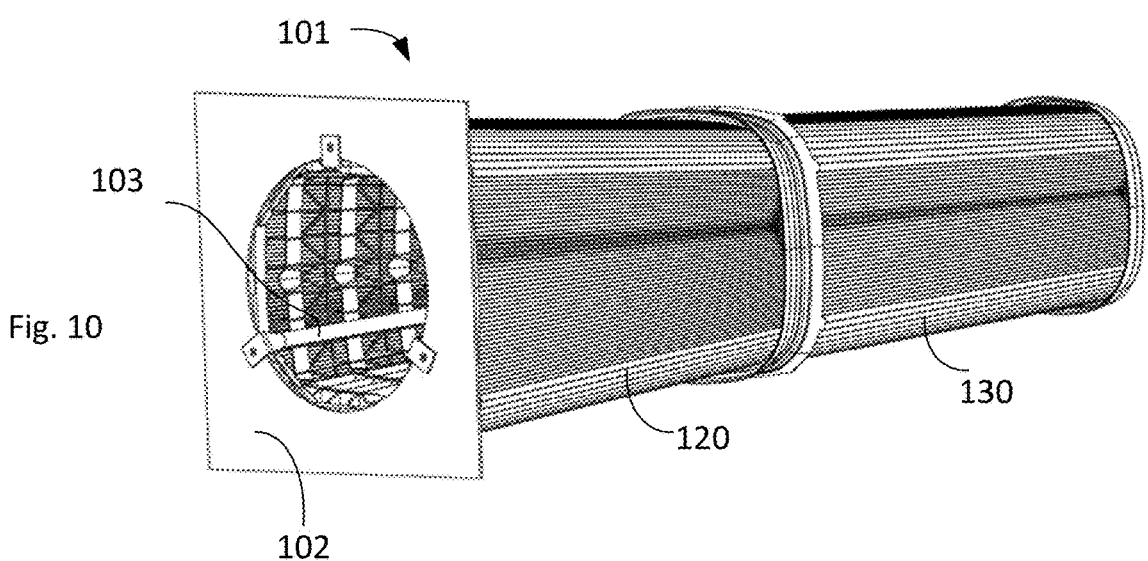
FIG. 10 shows a perspective view of a filter arrangement where two cartridges are mounted by means of a tripod.

In the examples of FIG. 1-10, the sealing lips 7a, 7b of the gasket have the same height in relation to the connection portion 6 and they extend to a common plane corresponding to an abutment surface of a mounting structure or a front end plate of an adjacent air filter cartridge. FIG. 10 shows an example, where two air filter cartridges are mounted on top of each other and are fixed to the base plate 102 by means of a tripod 103. In this case, both cartridges 120, 130 may have a mounting plate according to the present disclosure, and the mounting plate of the rear cartridge abuts the forward surface of the base plate, and the mounting plate of the front cartridge abuts the forward surface of the open front end plate 103 of rear filter cartridge 120. In this case the term forward refers to the closed end of the filter cartridge farthest away from the base plate.

Figures 11, 12, 13, 14:
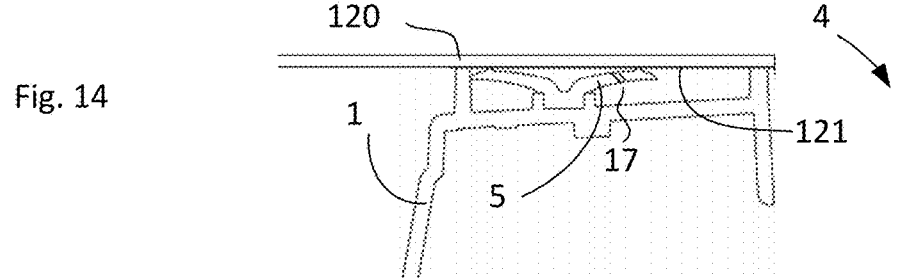
FIG. 11 shows a perspective view of another filter.
FIGS. 12 and 13 show enlarged views of details in FIG. 11.
FIG. 14 shows cross-sectional view of the gasket in FIG. 5, when compressed against a sealing surface of a tube sheet.

FIGS. 11-13 show an air filter cartridge of V-bank type. The mounting plate 1 includes a gasket 5 joined to the sealing surface 2. The gasket has double sealing lips 7a,7b, where a first sealing lip 7a is located outward of a second sealing lip 7b in relation to the opening 4, has a greater height than the second sealing lip 7b in relation to the connection portion 6.

FIG. 14 shows a mounting plate 1 including a gasket 5 which is mounted toward a sealing surface 121 of a tube sheet 120. An opening (pinhole) 17 is provided in the sealing lip directed toward the opening of the mounting plate 1, and thus toward the interior of an air filter cartridge including the mounting plate.

In all examples the sealing lips diverge by an angle of 20-60 degrees with respect to a center line extending through the connection portion.

Stop members 10 are located on the sealing side 2 of the mounting plate 1, on one or both sides of the gasket 5. The stop members 10 have an abutment surface 11 extending further from the mounting plate than the connection portion 6.

The person skilled in the art realizes that the present disclosure is not limited to the example embodiments described above. The person skilled in the art further realizes that modifications and variations are possible within the scope of the appended claims.

The invention claimed is:

1. An air filter mounting plate having a sealing side and a filter media retaining side, said mounting plate including an air passage opening and a gasket encircling the air passage opening provided on sealing side of the mounting plate wherein the gasket comprises a connection portion and double sealing lips extending from the connection portion, and wherein the gasket is joined with the mounting plate by the connection portion being fixed on the sealing side of the mounting plate, wherein at least one stop member is located on the sealing side of the mounting plate, said stop members having an abutment surface extending further from the mounting plate than the connection portion.

2. The air filter mounting plate of claim 1, wherein the connection portion is fixed in a recess.

3. The air filter mounting plate of claim 1, wherein the gasket is attached to the mounting plate by co-injection molding.

4. The air filter mounting plate of claim 1, wherein the connection portion of the gasket comprises an outermost attachment portion and a waist portion located between the outermost attachment portion and the double sealing lips, and a recess on the sealing side is configured to receive the outermost attachment portion of the gasket, and has an opening, which is narrower than the outermost attachment portion of the gasket.

5. The air filter mounting plate of claim 1, wherein the double sealing lips extend in divergent directions from the connection portion.

6. The air filter mounting plate of claim 1, wherein the double sealing lips have a curved cross-sectional shape.

7. The air filter mounting plate of claim 1, wherein at least one rib is provided on at least one of the double sealing lips, said rib being located in a vicinity of an outward edge of a lip.

8. The air filter mounting plate of claim 1, further comprising one or more attachment members protruding from the sealing side of the mounting plate, said attachment members being configured to attach the mounting plate to a base plate of an air filter arrangement and wherein the gasket is located outside of the attachment members in relation to the opening.

9. The air filter mounting plate of claim 1, wherein at least one of the double sealing lips tapers towards an outward edge of the double sealing lips to form a sharp lip edge.

10. The air filter mounting plate of claim 1, wherein the sealing lips have a same height in relation to the connection portion and extend to a common plane corresponding to an abutment surface of a mounting structure.

11. The air filter mounting plate of claim 1, wherein the sealing lips include a first sealing lip, which is located outward of a second sealing lip in relation to the opening, and which has a greater height than the second sealing lip in relation to the connection portion.

12. The air filter mounting plate of claim 1, wherein the sealing lips diverge by an angle of 20-60 degrees with respect to a center line extending through the connection portion.

13. The air filter mounting plate of claim 1, wherein an opening is provided in one of the sealing lips, said opening having a diameter of 0.1-10 mm, and being arranged in a second sealing lip, which is located inward of a first sealing lip in relation to the air passage opening.

14. The air filter mounting plate of claim 1, wherein the gasket is made of non-porous rubber or rubber having a permeability value less than 3 kg per s per m$^2$.

15. The air filter mounting plate of claim 1 wherein the gasket is made of rubber of 10-100 Shore A hardness.

16. The air filter mounting plate of claim 1 wherein the gasket is made of rubber of 25-75 Shore A hard ness.

17. The air filter mounting plate of claim 1 wherein the gasket is made of rubber of 40-70 Shore A hardness.

* * * * *